(12) United States Patent
Knoll et al.

(10) Patent No.: US 7,445,181 B2
(45) Date of Patent: *Nov. 4, 2008

(54) VARIABLE ENERGY ATTENUATING APPARATUS

(75) Inventors: Frank H. Knoll, Huntington Station, NY (US); Joseph M. Gaito, Levittown, NY (US)

(73) Assignee: East/West Industries, Inc., Ronkonkoma, NY (US)

( * ) Notice: Subject to any disclaimer, the term of this patent is extended or adjusted under 35 U.S.C. 154(b) by 84 days.

This patent is subject to a terminal disclaimer.

(21) Appl. No.: 11/202,177

(22) Filed: Aug. 12, 2005

(65) Prior Publication Data

US 2006/0011781 A1 Jan. 19, 2006

Related U.S. Application Data

(63) Continuation of application No. 10/105,372, filed on Mar. 26, 2002, now abandoned, which is a continuation of application No. PCT/US01/29912, filed on Sep. 25, 2001, and a continuation-in-part of application No. 09/668,156, filed on Sep. 25, 2000, now Pat. No. 6,378,939.

(51) Int. Cl.
*B64D 11/06* (2006.01)

(52) U.S. Cl. ............... 244/122 R; 297/216.1; 297/216.17

(58) Field of Classification Search ............ 244/122 R; 297/216.1, 216.7
See application file for complete search history.

(56) References Cited

U.S. PATENT DOCUMENTS

| | | | |
|---|---|---|---|
| 2,401,748 A | 6/1946 | Dillion | |
| 3,087,584 A | 4/1963 | Jackson et al. | |
| 3,968,863 A | 7/1976 | Reilly | |
| 4,003,534 A | 1/1977 | Kenigsberg | |
| 4,027,905 A | 6/1977 | Shimogawa et al. | |
| 4,150,805 A | 4/1979 | Mazelsky | |
| 4,349,167 A | 9/1982 | Reilly | |
| 4,358,154 A | 11/1982 | Campbell | |
| 4,408,738 A | 10/1983 | Mazelsky | |
| 4,423,848 A | 1/1984 | Mazelsky | |
| 4,439,167 A | 3/1984 | Bishop et al. | |
| 4,474,347 A | 10/1984 | Hazelsky | |
| 4,523,730 A | 6/1985 | Martin | |
| 4,997,233 A | 3/1991 | Sharon | |
| 5,125,598 A | 6/1992 | Fox | |
| 5,273,240 A | 12/1993 | Sharon | |
| 5,487,562 A | 1/1996 | Hedderly et al. | |
| 5,558,301 A | 9/1996 | Kerdoncuff et al. | |
| 5,842,669 A | 12/1998 | Ruff | |

(Continued)

OTHER PUBLICATIONS

Martin-Baker Aircraft Company, Ltd. Crashworth Utility Seat brochure; at least as early as Dec. 9, 1999, specific publication date unknown.

(Continued)

*Primary Examiner*—John W Eldred
(74) *Attorney, Agent, or Firm*—Cahn & Samuels, LLP (57) ABSTRACT

An energy attenuating apparatus for use with a seat includes an elongated attenuator having a resistance to bending which varies along its length. A bending mechanism defining a nonlinear path receives the attenuator. Translation of the bending mechanism relative to the attenuator in a lengthwise direction of the attenuator produces bending of the attenuator to absorb energy applied to the energy attenuating apparatus.

9 Claims, 8 Drawing Sheets

U.S. PATENT DOCUMENTS 5,971,489 A    10/1999  Smithson et al.
6,378,939 B1   4/2002   Knoll et al.
6,394,393 B1   5/2002   Mort
6,585,190 B2   7/2003   Mort

OTHER PUBLICATIONS

Martin-Baker Aircraft Company, Ltd. Crashworthy Troop Seat brochure; at least as early as Dec. 9, 1999, specific publication date unknown.

Simula Government Products, Inc., Lightweight, Energy-Absorbing, Rapidly Stowing Troop Seat; at least as early as Dec. 9, 1999, specific publication date unknown.

Simula Government Products, Inc. Lightweight, Energy-Absorbing, Quickly Stowing Troop Seat; at least as early as Dec. 9, 1999, specific publication date unknown.

Simula Government Products, Inc. Energy-Absorbing Troop Seat for S-70A-9 Black Hawk, at least as early as Dec. 9, 1999, specific publication date unknown.

Aircraft Crash Survival Design Guide, Simula, Inc. USARTL-TR-79-22D, Jun. 1980, pp. 106-124.

| STROKE | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| FORCE* | 1660 | 1660 | 1660 | 1660 | 1885 | 2237 | 2636 | 3085 | 3588 | 4147 | 4769 | 5456 | 6212 | 6979 |
| EA,width | 0.330 | 0.330 | 0.330 | 0.330 | 0.3424 | 0.360 | 0.3777 | 0.3954 | 0.4131 | 0.4307 | 0.4484 | 0.4661 | 0.4837 | 0.500 |
| EA,thick | 0.063 | 0.063 | 0.063 | 0.063 | 0.065 | 0.0678 | 0.0706 | 0.0734 | 0.0762 | 0.079 | 0.0818 | 0.0846 | 0.0874 | 0.09 |
| EA.area | 0.0208 | 0.0208 | 0.0208 | 0.0208 | 0.0223 | 0.0244 | 0.0267 | 0.0290 | 0.0315 | 0.0340 | 0.0367 | 0.0394 | 0.0423 | 0.0450 |

FIG. 14

VARIABLE ENERGY ATTENUATING APPARATUS

This Application is a continuation of application Ser. No. 10/105,372, filed Mar. 22, 2002, now pending, which is a continuation of PCT application Ser. No. PCT/U.S.01/29912, filed Sep. 25, 2001, now abandon, and a continuation-in-part of Ser. No. 09/668,156, filed Sep. 25, 2000 now U.S. Pat. No. 6,378,939 B1.

TECHNICAL FIELD

This invention relates to an energy attenuating apparatus for use with a seat that can absorb energy applied to the seat and a seat occupant during a sudden deceleration such as may occur during a crash of an aircraft. It also relates to a seat equipped with such an energy attenuating apparatus.

BACKGROUND ART

Seats of aircraft, and particularly military aircraft, are frequently equipped with devices generally referred to as energy attenuating apparatuses for absorbing energy generated during a crash or other sudden deceleration so as to reduce the forces applied to a seat occupant and thereby protect the seat occupant against injury. A number of energy attenuating apparatuses work on the principle of plastic deformation of an elongated member. One type of energy attenuating apparatus that has found significant use has an elongated wire, which passes along a nonlinear path between a plurality of rollers. When a force above a certain level acts on the energy attenuating apparatus, the rollers and the wire undergo translation with respect to each other, producing plastic deformation of the wire over a portion of its length as the region of the wire engaging the rollers moves down the length of the wire to dissipate kinetic energy of the seat and the seat occupant. The distance by which the rollers and the wire translate with respect to each other during actuation of the energy attenuating apparatus is referred to as the stroking distance of the energy attenuating apparatus. The stroke depends upon the energy to be dissipated by the energy attenuating apparatus during a crash and the resistance of the wire to deformation.

Existing energy attenuating apparatuses of the type described above employ a constant diameter wire that provides a constant resistance to translation with respect to the rollers over its length. The wire diameter is selected so that the energy attenuating apparatus can provide suitable energy attenuation during a crash for a seat occupant in the 50th weight percentile. While a seat occupant with a weight near the 50th weight percentile can be adequately protected, a light or heavy occupant may not receive sufficient protection. A light seat occupant may suffer dangerously high loads and very little seat stroking, while a heavy seat occupant may experience very light loads and very long seat stroking. Because of the light loads, the heavy seat occupant may require a greater stroking distance than is available in order for the energy attenuating apparatus to dissipate all of the crash energy. Therefore, a seat with a heavy occupant may bottom out before all the energy is attenuated, resulting in very high loads and energy being transmitted to the seat occupant rather than being dissipated by the energy attenuating apparatus.

DISCLOSURE OF THE INVENTION

The present invention provides an energy attenuating apparatus for a seat that has a varying resistance to deformation over its stroke to enable the energy attenuating apparatus to provide adequate protection to seat occupants over a wide range of weights.

According to one aspect of the present invention, an energy attenuating apparatus for use with a seat includes an elongated attenuator including a region having a start point and an end point. The region has a resistance to bending which increases along a length of the region from the start point to the end point. The energy attenuating apparatus also includes a bending mechanism defining a nonlinear path. The attenuator is engaged with the bending mechanism to traverse the nonlinear path such that the start point of the region traverses the bending mechanism ahead of the end point of the region. Relative movement of the attenuator and the bending mechanism in a lengthwise direction of the attenuator produces bending of the attenuator.

The energy attenuating apparatus may include a housing having first and second portions capable of telescopic movement with respect to each other. The attenuator may be disposed in the housing with first and second ends of the attenuator secured to the first portion, and the bending mechanism may be disposed inside the housing and secured to the second portion. The housing enables the energy attenuating apparatus to be easily installed on a seat or other structure with respect to which the apparatus is to perform energy attenuation.

According to another aspect of the invention, a method of attenuating forces applied to an aircraft seat is provided. The method includes receiving a force applied to an aircraft seat and passing the attenuator through the bending mechanism from the start point to the end point.

An energy attenuating apparatus according to the present invention is particularly suitable for use with aircraft seats, but it can be used with seats of any type of vehicle, such as land vehicles or marine vehicles. It can also be used to attenuate energy in conjunction with devices other than seats, such as parachutes, mountain climbing apparatus and vehicle bumpers.

In a preferred embodiment, an energy attenuating apparatus according to the present invention is installed on a seat so as to resist forces acting on the seat primarily in a direction parallel to the height direction of the seat, but it can also be used to resist forces acting on a seat in a fore-and-aft direction, in a lateral direction, or in a combination of different directions.

The resistance to bending of the attenuator can be varied along its length in a variety of manners, such as by varying the transverse cross-sectional area or the material properties of the attenuator. The resistance to bending can be selected so that the energy attenuating apparatus exerts predetermined forces within a permissible range to a wide range of the population during a crash while maintaining the stroking distance of a seat at a level so that bottoming out does not occur. For example, the attenuator can be selected to provide adequate protection during a crash to seat occupants ranging in weight from the 3rd percentile of females to the 98th percentile of males, with the maximum stroking distance remaining below about 14 inches.

MODES FOR CARRYING OUT THE INVENTION

FIGS. 1-4 illustrate an aircraft seat 100 equipped with an embodiment of an energy attenuating apparatus 170 according to the present invention. The illustrated seat is a troop seat for use in a helicopter, but the seat may be used in other types of aircraft or conveyances, and it is not restricted to use with a particular type of seat occupant. For example, the seat may be for a crew member of an aircraft. The seat 100 may have any structure that enables it to support a seat occupant in a desired manner. The illustrated seat 100 is intended for mounting on a bulkhead 20 or side wall of a helicopter, but alternatively, it may be mounted on a frame connected to the floor or the ceiling of the helicopter. The seat 100 includes a seat back 110 comprising a generally rectangular frame and a seat bottom 140 rotatably mounted on the lower end of the seat back 110 for supporting the buttocks of a seat occupant. The seat back 110 includes a pair of parallel legs 111 and top and bottom crosspieces 112 and 113 extending between the legs 111. The legs and crosspieces of the seat back 110 may be made of tubes, rods, plates, angles, or any other desired structural members and can be secured to each other in any convenient manner or can be integrally formed with each other. The seat back 110 is slidably supported by a pair of upper collars 130 and lower collars 135 which can be secured to the bulkhead 20 or other structural member that is to support the seat 100. Each upper collar 130 and lower collar 135 slidably receives one of the legs 111 of the seat back 110 to permit the seat back 110 to translate in its lengthwise direction. Each upper collar 130 and lower collar 135 can be secured by a pin, a bolt, or other member to a mounting bracket 138 for securing the seat 100 to the bulkhead 20. A pair of guide tubes 120 provides correct spacing between upper collar 130 and lower collar 135. Each guide tube 120 is preferably formed with two diametrically opposed longitudinally extending slits 121 through which a bolt or other member secured to a leg 111 of the seat back 110 can pass through.

Figure 2:
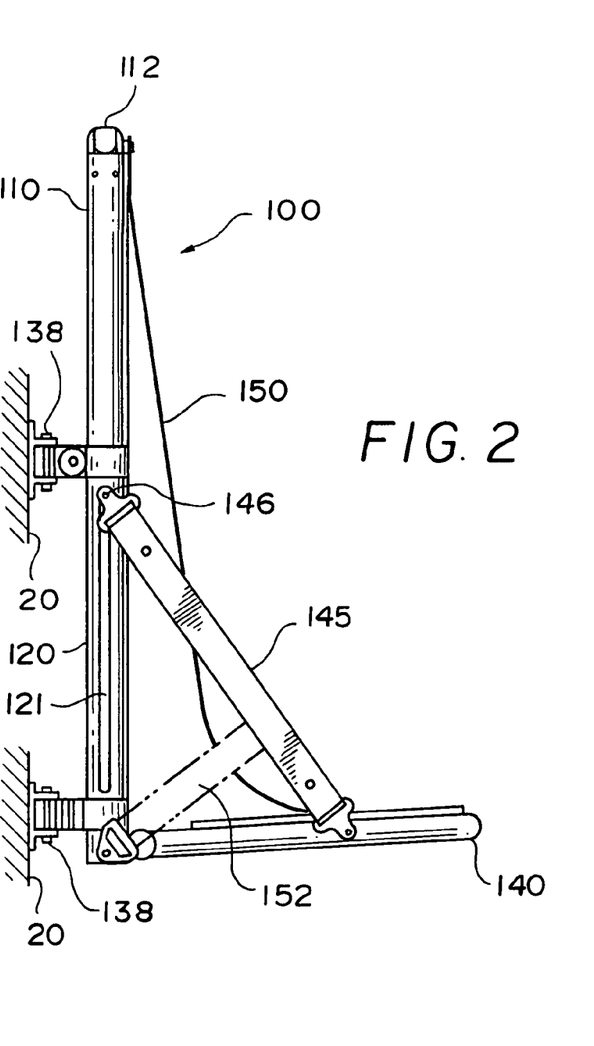
FIG. 2 is a side elevation of the seat of FIG. 1.

The seat bottom 140 can be rotated between a raised position in which it is folded against the seat back 110 and a lowered position, shown in FIG. 2, in which the seat bottom 140 can support the buttocks of a seat occupant. In its lowered position, the seat bottom 140 is supported by a pair of straps 145, each of which has an upper end secured to one of the legs 111 of the seat back 110 by a bolt 146 extending through the slits 121 in one of the guides 120 and a lower end secured to the seat bottom 140. The back of a seat occupant is supported by a flexible back support 150 which extends from an upper end of the seat back 110 to the seat bottom 140, although a cushion or other type of back support may instead be employed. The seat 100 may be equipped with other conventional equipment, such as shoulder straps 151, a lap belt 152, a headrest, and a seat cushion on the seat bottom 140. In addition, the seat 100 is compatible with 3 point, 4 point and 5-point harness restraint systems (not shown). While the illustrated seat 100 is of a folding type, it may also be one in which the seat bottom 140 is maintained at a constant angle with respect to the seat back 110.

Figure 1:
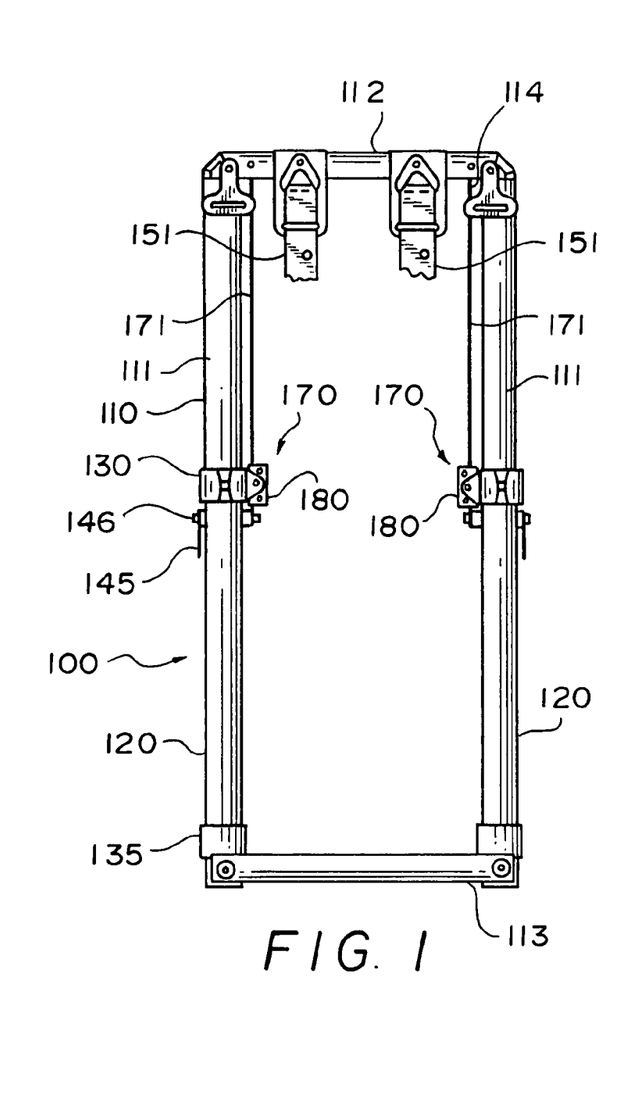
FIG. 1 is a rear elevation of a seat equipped with an embodiment of an energy attenuating apparatus according to the present invention with the energy attenuating apparatus in an initial state.

As illustrated in FIG. 1, the seat 100 is equipped with one or more energy attenuating apparatuses 170 according to the present invention. The illustrated embodiment includes two energy attenuating apparatuses 170, but it is possible to employ a single such apparatus 170 or more than two. The apparatuses 170 are preferably installed symmetrically with respect to a widthwise centerline of the seat 100 so that a load applied to the seat 100 will be symmetrically distributed among the apparatuses 170. The energy attenuating apparatuses 170 prevent downward movement of the seat 100 during normal operating conditions of the helicopter but allow the seat 100 and its occupant to move downwards at a controlled rate while absorbing energy during a crash or other sudden deceleration (hard landings).

Attenuating Apparatus

Figure 5:
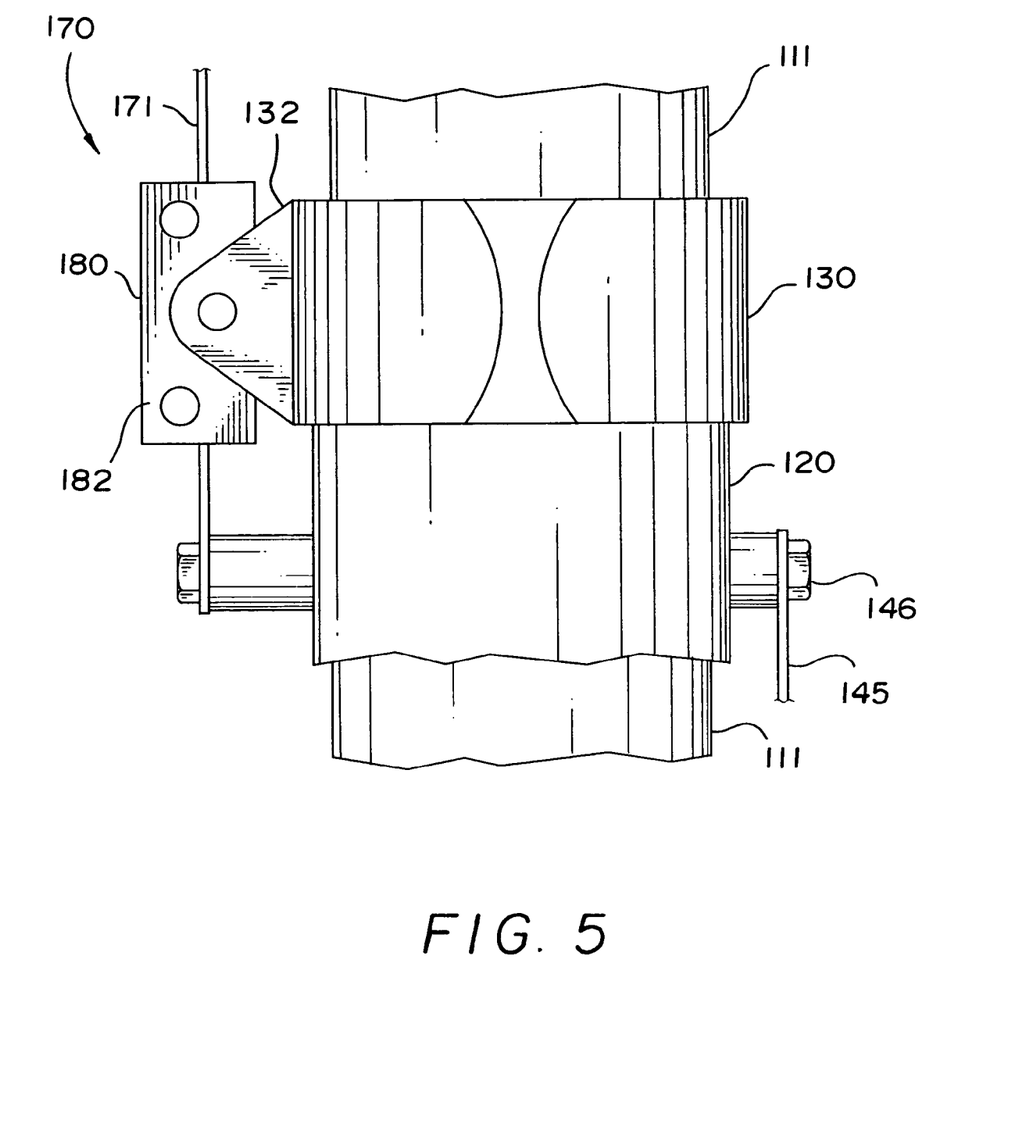
FIG. 5 is an enlarged rear elevation of a portion of the seat arrangement of FIG. 1.

As illustrated in FIG. 5, each energy attenuating apparatus 170 includes an elongated attenuator 171 and a bending mechanism 180 for bending the attenuator 171 when the attenuator 171 and the bending mechanism 180 undergo relative movement in the lengthwise direction of the attenuator 171. The attenuator 171 and the bending mechanism 180 are not restricted to any particular structure. In the present embodiment, each attenuator 171 comprises a substantially flat strip preferably having a variable cross section. Alternatively, an attenuator 171 may be a wire of circular, polygonal, or other transverse cross-sectional shape. The attenuators 171 are made of a material capable of being bent by the bending mechanisms 180 without breaking during activation of the energy attenuating apparatuses 170. Metals are particularly suitable for the attenuators 171, but plastics or other materials may also be used. More preferably, attenuators 171 may be formed from a metal alloy such as 4130 COND N stainless steel.

Figure 6:
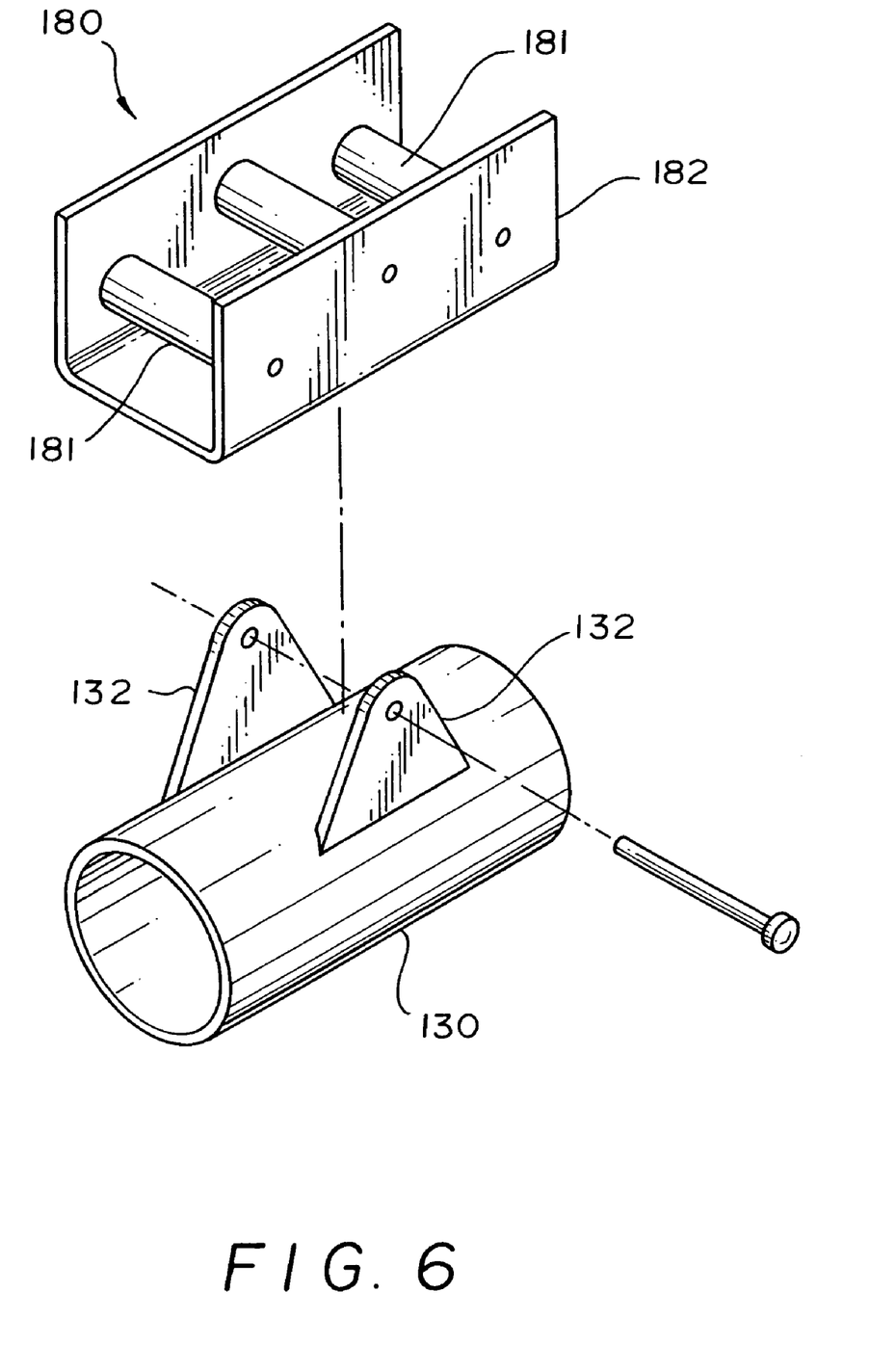
FIG. 6 is an exploded perspective view of one of the bending mechanisms and the corresponding upper collar of the embodiment of FIG. 1.

Each bending mechanism 180 defines a nonlinear path through which a corresponding one of the attenuators 171 can pass while undergoing bending deformation by one of the bending mechanisms 180. Typically the bending mechanism 180 includes a plurality of rigid bending members, such as pin, bars, or rollers, around which the attenuator 171 passes along the nonlinear path. The illustrated bending mechanism 180 depicted in FIG. 6 may be generally of the type described in U.S. Pat. No. 3,968,863 entitled "Energy Attenuator", including three rollers 181 which have parallel axes, with one of the axes being disposed from a plan passing through the other two axes. All three rollers 181 are supported by a U-shaped support frame 182.

Generally in this type of energy attenuating apparatus 170, the attenuator 171 undergoes plastic deformation as it passes through the bending mechanism 180, but it is also possible for the deformation to be entirely elastic if sufficient energy can be dissipated by elastic deformation.

Each attenuator 171 has first and second ends that are immobilized with respect to each other at a constant separation. Each attenuator 171 passes along a nonlinear path through a corresponding one of the bending mechanisms 180 between the two ends of the attenuator 171. One of each bending mechanism 180 is immobilized with respect to one of the guides 120, and one of each attenuator 171 is secured to some portion of the seat 100 so as to be capable of translating along with the seat back 110 with respect to the upper collars 130 during a crash. For example, in the present embodiment, each attenuator 171 is secured at its opposite ends to the seat back 110, while each bending mechanism 180 is secured to a pair of lugs 132 on the upper collar 130 of one of the guides 120 of the seat 100. Alternatively, the attenuators 171 may be immobilized with respect to the guides 120 by being secured to the guides 120 or to the bulkhead 20, for example, and the bending mechanisms 180 may be secured to the seat back 110 so as to translate together with the seat back 110 with respect to the guides 120 during a crash. The attenuators 171 may be secured to the seat back 110 in any convenient manner. In the illustrated embodiment (FIG. 1), the lower end of each attenuator 171 is secured to the bolt 146 which is secured to the upper end of one of the support straps 145 for the seat bottom 140, and the upper end of each attenuator 171 is secured to an angle bracket 114 which is secured to the upper crosspiece 112 of the seat back 110.

The resistance of each attenuator 171 to bending by the corresponding bending mechanism 180 is sufficiently large that under normal operating conditions, the engagement between the attenuators 171 and the bending mechanisms 180 prevents the downward movement of the seat back 110 under the weight applied to the seat 110 by the seat occupant and any equipment worn or carried by the occupant, and the seat back 110 remains in a raised position as shown in FIGS. 1 and 2. However, when the downward force acting on the seat back 110 in its lengthwise direction exceeds a predetermined level, such as during a crash, the resistance to bending by the attenuators 171 is overcome, and the seat back 110 slides downwards with respect to the guides 120 to a lowered position shown in FIGS. 3 and 4 while the attenuators 171 pass through the bending mechanisms 180 and are deformed in the process, thereby absorbing the kinetic energy of the seat 100 and its occupant.

Figure 3:
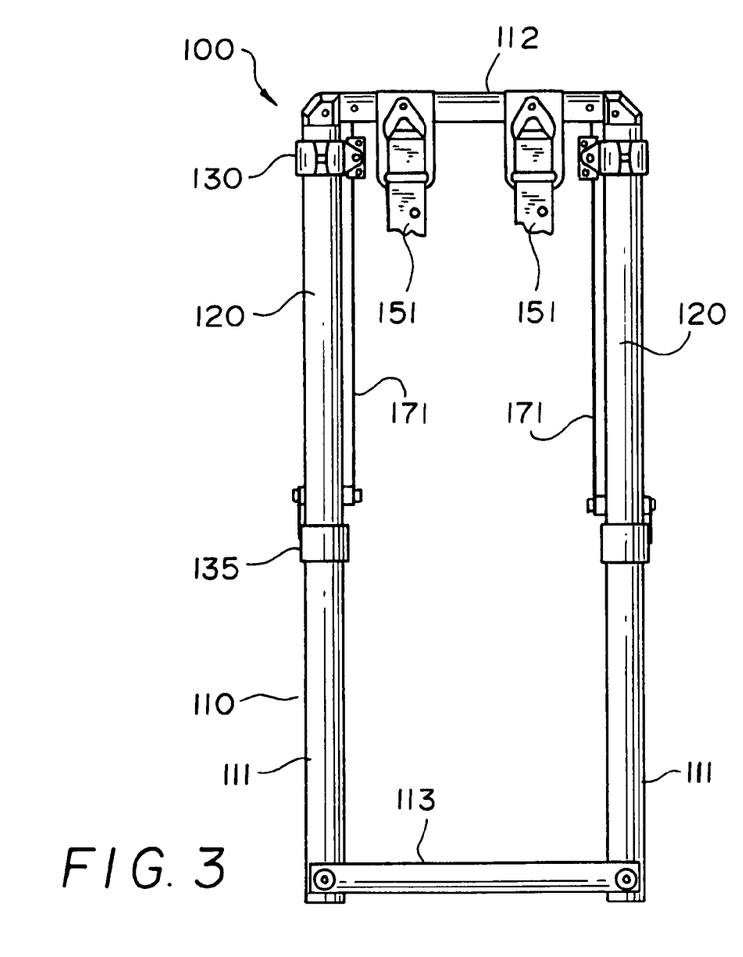
FIG. 3 is a rear elevation of the seat of FIG. 1 with the energy attenuating apparatus in an activated state.
Figure 4:
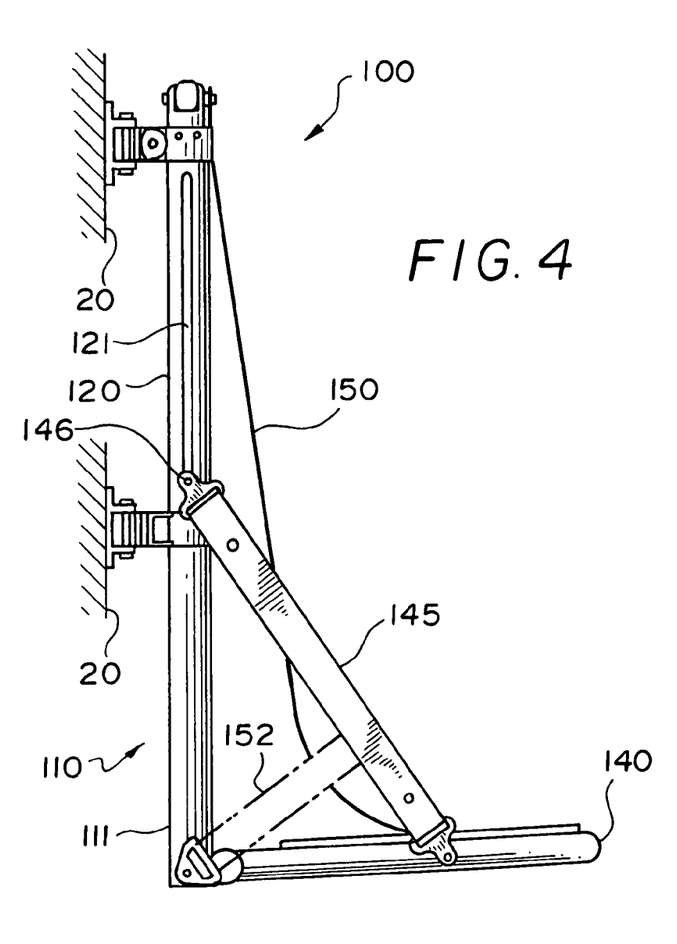
FIG. 4 is a side elevation of the seat in the state shown in FIG. 3.

During a crash of the helicopter, the seat back 110 will usually initially move downwards towards the floor of the helicopter from the position shown in FIGS. 1 and 2 to the position shown in FIGS. 3 and 4. However, after this initial downward movement, the seat back 110 may rebound upward back towards the position shown in FIGS. 1 and 2. Because the lengthwise ends of each attenuator 171 are immobilized with respect to each other, the attenuators 171 can dissipate energy whether moving downwards with respect to the bending mechanisms 180 during the initial downwards movement of the seat back 110 or upwards with respect to the bending mechanisms 180 during a rebound of the seat back 110. Therefore, the energy attenuators 171 can protect a seat occupant during the various stages of a crash.

In order for the energy attenuating apparatuses 170 to cope with seat occupants of different weights, in keeping with the invention, the bending resistance of each attenuator 171 preferably varies over its length, increasing from its lower end to its upper end. As a result, each attenuator 171 will begin to yield under a relatively low force corresponding to the downward force exerted on the seat 100 during a crash by a light occupant, but the seat 100 will not bottom out, i.e., hit a rigid obstruction under the weight of a heavy seat occupant.

The bending resistance of an attenuator 171 can be varied in a number of different ways. For an attenuator 171 with constant material properties, the bending resistance increases with increasing transverse cross-sectional area. Therefore, one way of varying the bending resistance of an attenuator 171 is by varying its transverse cross-sectional area by varying its thickness and/or its width along its length. It is generally easier to manufacture an attenuator 171 of varying width than of varying thickness, but space limitations may make it difficult to achieve a desired range of cross-sectional areas relying solely on a variation in width. Therefore, it may be convenient to simultaneously vary both the thickness and the width of an attenuator 171, in either a continuous or a stepwise manner.

Another way of varying the bending resistance of an attenuator 171 is to vary a material property that affects the bending resistance, such as the modulus of elasticity of the attenuator 171. The modulus of elasticity can be varied by using different materials for different regions of the attenuator 171 along its length. The yield stress level may be varied by using a single material and heat-treating or otherwise processing different regions of the attenuator 171 in different manners.

Figure 7:
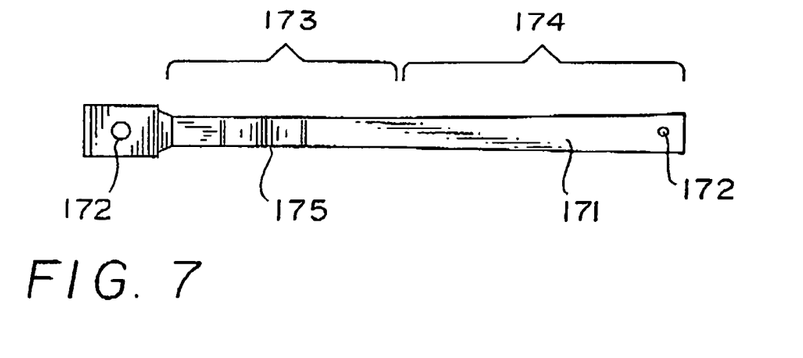
FIG. 7 is a plan view and FIG. 8 is a side view of one of the attenuators in its initial shape.
Figure 8:
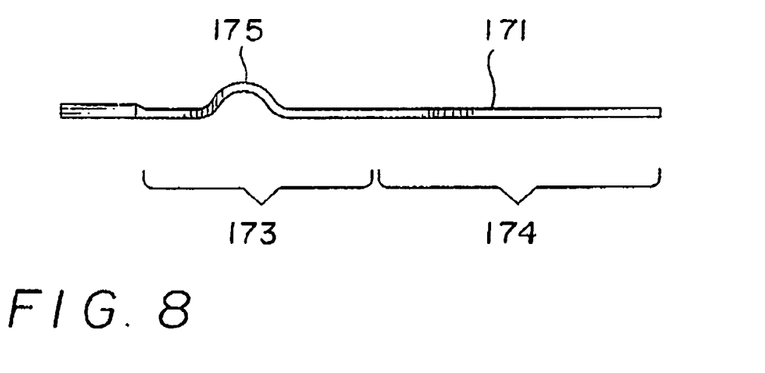

FIGS. 7 and 8 are respectively a plan view and a side elevation of one of the attenuators 171 of the embodiment of FIG. 1. Each of attenuators 171 preferably comprises an elongated strip of 4130 steel or other suitable materials. A hole 172 is formed in each lengthwise end of the attenuator 171 for receiving a bolt or other member by which the attenuator 171 can be secured to the seat back 110. When mounted on the seat back 110, the left end of the attenuator 171 in FIG. 7 is the lower end and the right end is the upper end. A first region 173 of the attenuator 171 near its lower end has a constant width (such as 0.330 inches in this example) and a constant thickness (such as 0.063 inches). A second region 174 extending from the right end of the first region 173 to the right end of the attenuator 171 has a width and a thickness which both increase linearly towards the right end. For example, in this example, the width increases linearly in the second region 174 from 0.330 inches to 0.500 inches, and the thickness increases linearly in the second region 174 from 0.063 inches to 0.090 inches. The thickness and/or width of the attenuator 171 may be increased in the vicinity of one or both holes 172 to provide additional strength in these regions. In this example, the width and thickness of the region of the attenuator 171 surrounding the left hole 172 are increased to roughly the same width and thickness as in the region of the attenuator 171 surrounding the right hole 172. A bend 175 which can be inserted between the rollers 181 of the bending mechanism 180 is formed in the first region 173 of the attenuator 171. As the attenuator 171 translates through the bending mechanism 180 during activation of the energy attenuating apparatus 170, the bend 175 translates down the attenuator 171 towards its right end.

Figure 13:
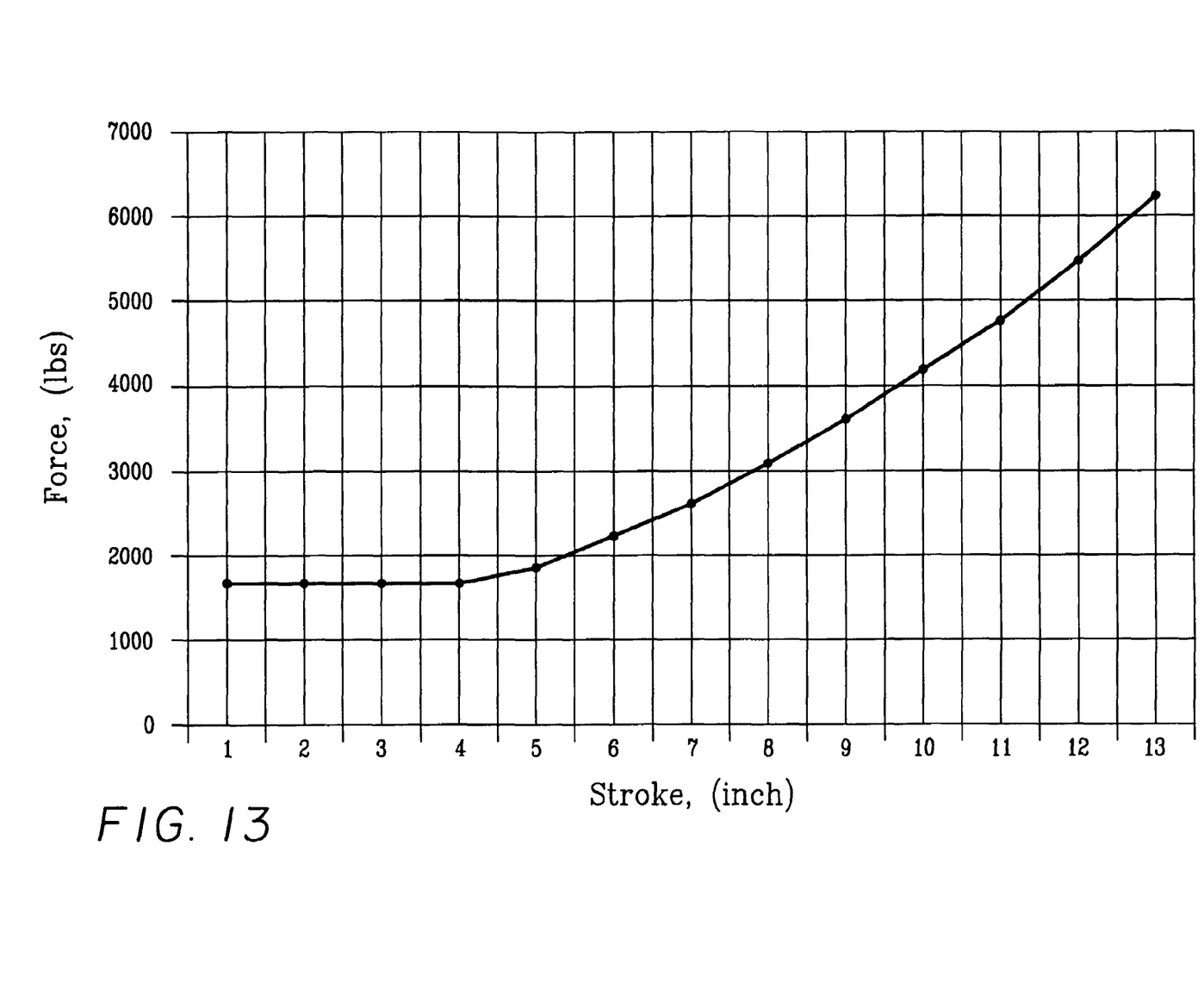
FIG. 13 is a graph of Force v. Stroke for an embodiment of the present invention.
Figure 14:
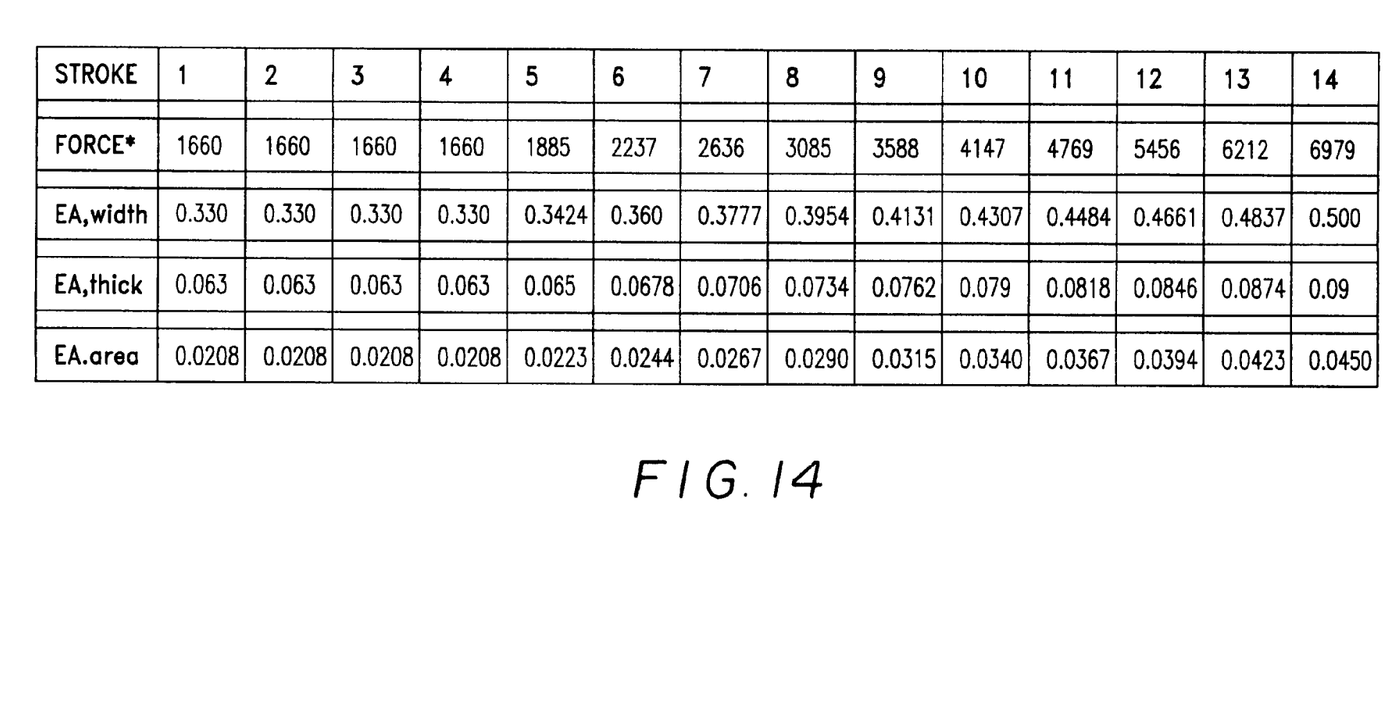
FIG. 14 is a table showing the variation of width, thickness and area of an attenuator in accordance with the present invention.

Due to the varying thickness and width of the attenuator 171, the force required to translate the attenuator 171 with respect to the bending mechanism 180 increases along the length of the attenuator 171 towards its right (upper) end. In a preferred embodiment, when the bending mechanism 180 engages the first region 173 of the attenuator 171 having a constant width and thickness, the energy attenuating apparatus 170 can resist a force F acting in the lengthwise direction of the attenuator 171 of up to approximately 1660 pounds without relative movement of the bending mechanism 180 and the attenuator 171, above which force the attenuator 171 can translate in its lengthwise direction through the nonlinear path defined by the bending mechanism 180. The force required to translate the attenuator 171 remains constant in the first region 173 and then increases, in the second region 174 as the thickness and width of the attenuator 171 increase, reaching a maximum value in this particular example of approximately 7000 pounds at the right end of the attenuator 171. FIG. 13 illustrates a graph of force v. stroke for seat 100 employing a pair of attenuators 171 as described above. FIG. 14 shows the change in width and thickness of attenuators 171 as the force and stroke increase.

Figure 9:
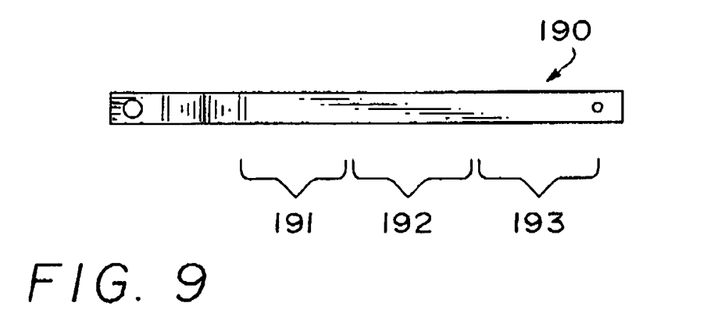
FIGS. 9 and 10 are respectively a plan view and a side view of an example of an attenuator having a plurality of regions having different material properties.
Figure 10:
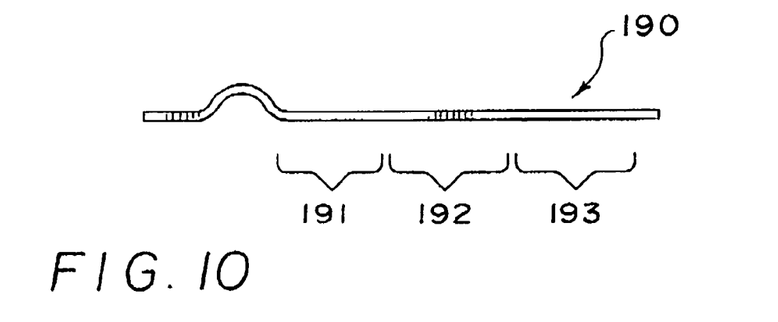

FIGS. 9 and 10 are respectively a plan view and a side elevation of an example of an attenuator 190 which has a varying bending resistance along its length due to having a plurality of regions along its length of different material properties. The illustrated example has three different regions 191-193, but a larger or smaller number of regions may be employed. The bending resistance of the attenuator 190 is greater in region 192 than in region 191 and is greater in region 193 than in region 192. The different regions may be made of different materials, or they may be made of the same material that is heat treated or otherwise processed to give the different regions different material properties.

Figure 11:
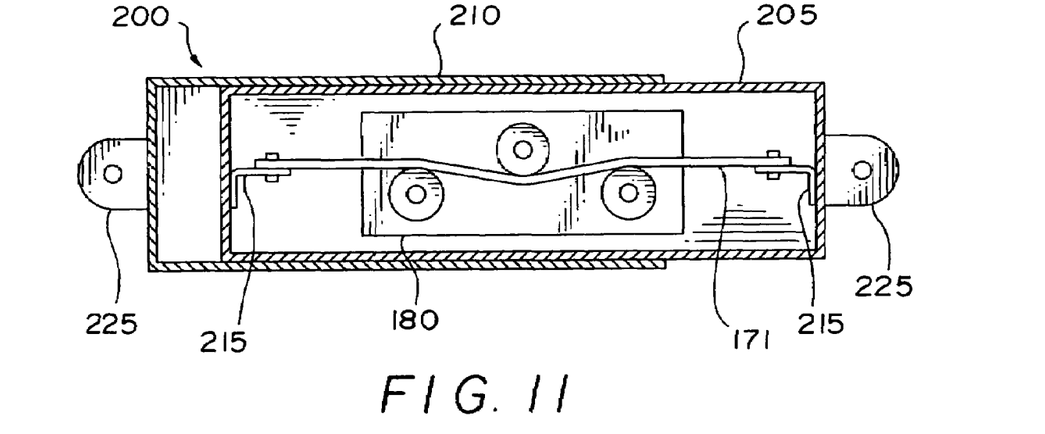
FIGS. 11 and 12 are respectively a vertical cross-sectional view and a horizontal cross-sectional view of another embodiment of an energy attenuating apparatus according to the present invention.
Figure 12:
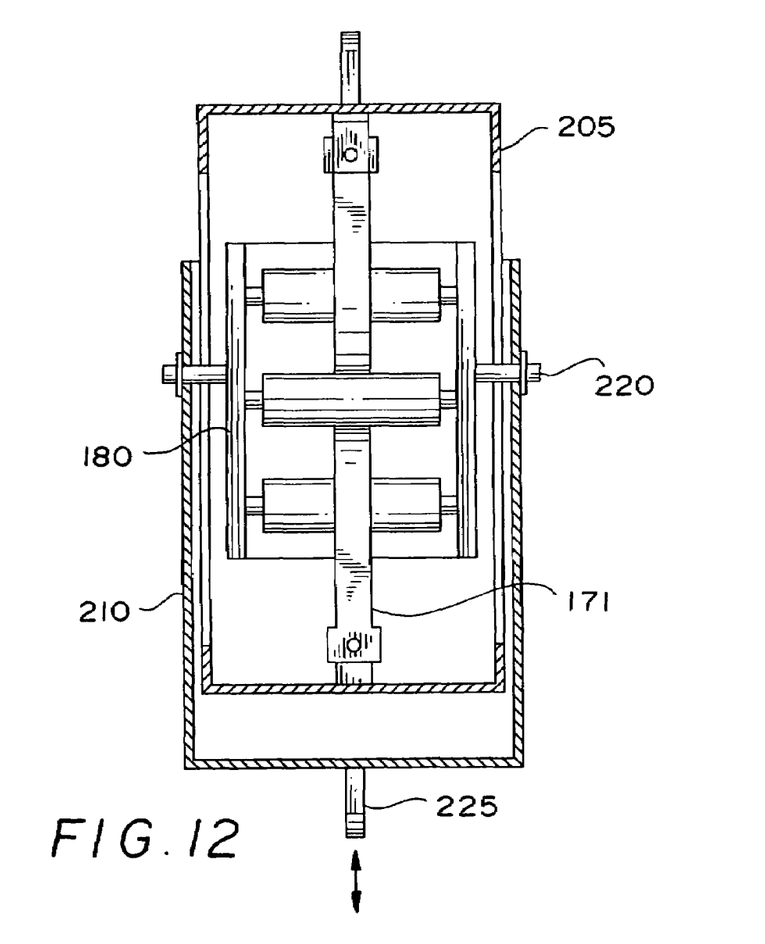

An energy attenuating apparatus according to the present invention is not limited to the configuration shown in FIGS. 1-6. FIGS. 11 and 12 are respectively a vertical cross-sectional view and a horizontal cross-sectional view of another embodiment of an energy attenuating apparatus according to the present invention. The overall structure of this embodiment is similar to that of the device disclosed in U.S. Pat. No. 3,968,863, but whereas the device of that patent employs a wire of constant cross-section as an energy attenuator, this embodiment employs an energy attenuator 171 like that shown in FIGS. 7 and 8 having a bending resistance which varies along its length. The apparatus includes a housing assembly 200 having an inner housing 205 and an outer housing 210 capable of telescopic movement with respect to each other. Attenuator 171 is disposed within housing assembly 200 and is preferably fixedly attached to each end of inner housing 205. Thus, attenuator 171 may be suspended within an inner cavity of inner housing 205. As illustrated in FIGS. 11 and 12, inner housing 205 may be provided with brackets 215 on each end to which attenuator 171 may be attached by bolts, rivets or any other suitable attachment mechanism. For example, bolts may be threaded through hole 172 (FIG. 7) and engaged with brackets 215 to affix attenuator 171 to inner housing 205. Notwithstanding the foregoing, it will be appreciated that there are many alternative possibilities for securing the attenuator 171 within inner housing 205, such as by welding, tying, etc.

A bending mechanism such as bending mechanism 180 is preferably disposed within the inner housing 205 and attached to the outer housing 210. Bending mechanism 180 engages attenuator 171 as shown in FIGS. 11 and 12. Bending mechanism 180 is preferably attached to the outer housing assembly 210 by pin 220. Pin 220 preferably extends through longitudinal slots in inner housing assembly 205. These longitudinal slots, not illustrated, extend for a sufficient distance to allow the inner and outer housings 205 and 210 to telescope through their design stroke length.

As inner housing 205 and outer housing 210 telescope with regard to one another, bending mechanism 180 bends attenuator 171, thereby expending energy. The amount of force required to cause the two housings to begin to telescope with regard to one another is a design consideration which can be influenced by several factors. As discussed above, the bending resistance of attenuator 171 may be varied by varying its transverse cross-sectional area or by varying a material property. By employing attenuator 171 in housing assembly 200, a wide range of stroking loads may be accommodated without further adjustments.

The attenuator assembly according to this embodiment may be attached directly to the seat back 110 and to collar 130. More particularly, a first end of inner housing 205 is provided with an eyelet 225 as is a first end of outer housing 210. One of the first ends of inner housing 205 and outer housing 210 is preferably attached to a stationary point and the other of the first ends is preferably attached to a translating point. For example, the first end of inner housing 205 may be attached to seat back 110 while a first end of outer housing 210 may be attached to upper collar 130. Alternatively, the first end of inner housing 205 may be attached to upper collar 130 while the first end of outer housing 205 may be attached to seat back 110.

INDUSTRIAL APPLICABILITY

The present invention may be advantageously employed in seats for aircraft crewmembers and passengers, marine vessel crewmembers and passengers and land vehicle occupants.

While the invention has been disclosed with reference to a limited number of embodiments, it is apparent that variations and modification may be made therein. For example, a single energy attenuating apparatus may be engaged with the seat in a position to attenuate collision force, i.e., near the middle of the seat either along the seat back or below the seat bottom. In addition, a plurality of energy attenuating apparatuses may be employed depending upon the specific application. It is therefore intended in the following claims to cover each such variation and modification as falls within the true spirit and scope of the invention.

What is claimed is:

1. An energy attenuating apparatus for use with a seat comprising:

an elongated attenuator including a region having a start point and an end point, the region includes a resistance to bending which increases along a length of the region from the start point to the end point, and a bending mechanism defining a nonlinear path, the attenuator being engaged with the bending mechanism to traverse the nonlinear path such that the start point of the region traverses said bending mechanism ahead of the end point of the region and relative movement of the attenuator and the bending mechanism in a lengthwise direction of the attenuator produces bending of the attenuator.

2. The energy attenuating apparatus of claim 1 wherein the bending mechanism comprises a plurality of rollers around which the attenuator passes.

3. The energy attenuating apparatus of claim 1 wherein the attenuator includes a polygonal cross section.

4. The energy attenuating apparatus of claim 1 further comprising a housing assembly including an inner housing and an outer housing capable of telescopic movement with respect to each other, the attenuator being disposed in the housing assembly with first and second ends thereof secured to the inner housing, and the bending mechanism being disposed inside the housing assembly and secured to the outer housing.

5. An energy attenuating apparatus for use with a seat comprising:

an elongated attenuator including a region having a start point and an end point, the region includes a transverse cross sectional area that increases along a length of the region from the start point to the end point, and a bending mechanism defining a nonlinear path, the attenuator being engaged with the bending mechanism to traverse the nonlinear path such that the start point of the region traverses said bending mechanism ahead of the end point of the region and relative movement of the attenuator and the bending mechanism in a lengthwise direction of the attenuator produces bending of the attenuator.

6. The energy attenuating apparatus of claim 5 wherein the region of the attenuator has a width and a thickness and wherein one of the width and thickness increases along the length of the region.

7. The energy attenuating apparatus of claim 6 wherein one of the width and thickness increases continuously along the length of the region.

8. The energy attenuating apparatus of claim 6 wherein one of the width and thickness increases in a step increments along the length of the region.

9. A method of attenuating forces applied to an aircraft seat, the aircraft seat including the energy attenuating apparatus of claim 5, said method comprising:

receiving a force applied to said aircraft seat; and passing the attenuator through the bending mechanism from the start point to the end point responsive to the received force thus dissipating the force within the attenuator.

* * * * *